United States Patent [19]

Chesterfield et al.

[11] Patent Number: 5,143,662

[45] Date of Patent: Sep. 1, 1992

[54] PROCESS FOR PREPARING PARTICLES OF BIOABSORBABLE POLYMER

[75] Inventors: Michael P. Chesterfield, Norwalk; Ross R. Muth, Brookfield; John Kennedy, Stratford, all of Conn.

[73] Assignee: United States Surgical Corporation, Norwalk, Conn.

[21] Appl. No.: 654,219

[22] Filed: Feb. 12, 1991

[51] Int. Cl.$^5$ .............................................. B29B 9/10
[52] U.S. Cl. ............................................. 264/8; 623/66
[58] Field of Search .................. 264/8; 425/8; 623/16, 623/66

[56] References Cited

U.S. PATENT DOCUMENTS

| | | |
|---|---|---|
| 3,549,731 | 12/1970 | Kohn et al. . |
| 3,741,703 | 6/1973 | Reynolds . |
| 3,743,464 | 7/1973 | Strobert . |
| 3,812,224 | 5/1974 | Smith et al. . |
| 3,882,858 | 5/1975 | Klemm . |
| 3,981,957 | 9/1976 | van Brederode et al. . |
| 4,100,236 | 7/1978 | Gordon et al. . |
| 4,118,449 | 10/1978 | Rinde . |
| 4,186,448 | 2/1980 | Brekke . |
| 4,200,601 | 4/1980 | McClain . |
| 4,256,677 | 3/1981 | Lee . |
| 4,315,720 | 2/1982 | Ueda et al. ............................. 425/8 |
| 4,329,304 | 5/1982 | McClain . |
| 4,336,210 | 6/1982 | McClain . |
| 4,340,550 | 7/1982 | Ho ......................................... 264/13 |
| 4,430,451 | 2/1984 | Young et al. . |
| 4,485,055 | 11/1984 | Bung et al. ............................. 264/8 |
| 4,519,909 | 5/1985 | Castro . |
| 4,535,485 | 8/1985 | Ashman et al. . |
| 4,547,390 | 10/1985 | Ashman et al. . |
| 4,643,735 | 2/1987 | Hayes et al. ........................... 623/16 |
| 4,648,820 | 3/1987 | Scruggs et al. ........................ 425/8 |
| 4,663,447 | 5/1987 | Yamazaki et al. . |
| 4,673,695 | 6/1987 | Aubert et al. . |
| 4,675,140 | 6/1987 | Sparks et al. ........................ 264/4.3 |
| 4,693,986 | 9/1987 | Vit et al. . |
| 4,701,289 | 10/1987 | Liles et al. ............................. 264/8 |
| 4,734,227 | 3/1988 | Smith ................................... 264/13 |
| 4,810,775 | 3/1989 | Bendix et al. ........................ 528/480 |
| 4,822,534 | 4/1989 | Lencki et al. . |
| 4,822,535 | 4/1989 | Ekman et al. . |
| 4,873,091 | 10/1989 | Jankower et al. ................... 424/489 |
| 4,933,105 | 6/1990 | Fong . |
| 4,940,734 | 7/1990 | Ley et al. . |
| 4,981,625 | 1/1991 | Rhim et all ......................... 264/13 |
| 5,007,939 | 4/1991 | Delcommune et al. ............. 623/66 |
| 5,015,423 | 5/1991 | Eguchi et al. ........................ 264/9 |
| 5,015,667 | 5/1991 | Yoshimura et al. ................. 521/58 |
| 5,019,302 | 5/1991 | Sparks et al. ......................... 264/8 |
| 5,019,400 | 5/1991 | Gombotz et al. . |
| 5,030,391 | 7/1991 | Sumita et al. ......................... 264/5 |
| 5,047,180 | 9/1991 | Steiner et al. ........................ 264/5 |
| 5,047,450 | 9/1991 | Wilder ................................ 523/435 |

FOREIGN PATENT DOCUMENTS 265906 5/1988 European Pat. Off. .
274898 7/1988 European Pat. Off. .

OTHER PUBLICATIONS

NASA Tech Briefs, Sep. 1987, p. 50.
J. Microencapsulation, 1988; vol. 5, No. 2, 147-157.

*Primary Examiner*—Mary Lynn Theisen
*Attorney, Agent, or Firm*—Thomas R. Bremer; Peter G. Dilworth; Rocco S. Barrese

[57] ABSTRACT

A process is provided for preparing bioabsorbable polymer particles employing rotary atomization.

30 Claims, No Drawings

PROCESS FOR PREPARING PARTICLES OF BIOABSORBABLE POLYMER

BACKGROUND OF THE INVENTION

This invention relates to a process for preparing particles of bioabsorbable polymer, e.g., spheroidal particulates or beads, employing the technique of rotary atomization. The particles are useful, inter alia, in medical diagnostic procedures such as mammography and in the repair of damaged or defective bone.

The medical use of polymer particles including those of the bioabsorbable variety are known, inter alia, from U.S. Pat. Nos. 3,882,858; 4,535,485; 4,547,390; 4,643,735; and 4,663,447. Particles of bioabsorbable polymer have been utilized to facilitate bone or fibrous tissue repair/reconstruction.

The problem of repairing defective bone has presented difficulties for some time. Until recently, the only practical technique was to immobilize damaged or broken bones and to rely upon nature to effect regrowth of skeletal tissue into a cavity in bone. With the advent of surgical techniques, it has become possible to utilize implanted bone substitutes, i.e. prostheses, to replace injured or diseased bone structure and to repair congenital or degenerative defects in the skeletal structure. The processes of bone formation and renewal are carried out by specialized cells. Bioabsorbable polymer particles constitute one type of such prosthesis facilitating the regrowth/rejuvenation of surrounding bone.

More specifically, such prosthesis comprises a quantity of bioabsorbable polymer particles which initially are not bonded together. The particles can be inserted into areas of bone defects such as cavities, or packed into any hard tissue part of the body in which repair, reconstruction, or replacement is desired. Areas where the loose individual bioabsorbable polymer particles can be applied include, e.g., dental applications such as filling in diseased recessions or pockets within a tooth or between adjacent teeth, and also non-oral applications including fracture healing, filling of defective bone areas, bone replacement, etc.

The bioabsorbable polymer particles in loose form can be initially packed into cavities or other areas of hard tissue defect or disease. When a void in a hard tissue area is completely filled with the loose, individual particles of bioabsorbable polymer, the surrounding soft tissue can be sutured over the particles to completely enclose them. Once enclosed, the particles come into contact with each other, forming pores that are readily wettable by blood and body fluids. In this way, bone growth is promoted and bone recession prevented. As the healing process progresses, ingrowth of surrounding bone and/or tissue throughout the interstices of the packed particles occurs, with the bioabsorbable particles gradually being resorbed by the growing bone or tissue and resulting in healed bone or tissue structure. Thus, the bioabsorbable particles serve as a matrix support for active replacement of missing bone or tissue. More particularly, these implanted particles of bioabsorbable polymer serve as both a structural support and as a guiding matrix for encroaching bone deposits derived ultimately from adjacent fresh bone.

With the increase in interest in utilizing bioabsorbable polymer particles to facilitate bone or fibrous tissue repair/reconstruction, the need to provide such particles with optimum shape, dimensions and restorative or diagnostic properties has also increased. For example, such particles of bioabsorbable polymer should be prepared with as uniform sizes as possible, in order to optimally effect the restorative procedures.

Because of the hygienic nature of application, the bioabsorbable polymer particles must be maintained in decontaminated form. In other words, the polymer and resulting particles cannot become contaminated, so that processing of the bioabsorbable polymer, including breakup into the individual particles thereof, must be carried out under totally sanitary conditions. Therefore, processing of the bioabsorbable polymer into particles must be carried out using the polymer alone or with relatively little solvent present, i.e., when the polymer is in viscous state.

A number of processes are known for preparing finely divided polymeric particles, e.g., mechanical grinding, solvent precipitation, dispersion, spray atomization of solutions or slurries and rotary atomization. In rotary atomization, the polymer is applied to a rotating bell, cup, or disk, with mechanical forces predominating in the breakup of the polymer into particles. More specifically, the polymer is introduced near the center of the rotating bell, cup, or disk whereby centrifugal force distributes the polymer to the edge of the rotating bell, cup, or disk, at which the polymer has an angular velocity close to the angular velocity of the rotating bell, cup, or disk. As the polymer leaves the surface of the rotating bell, cup, or disk at the outer edge thereof, a principal velocity component thereof is tangential to the rotating member, and the polymer is spun off in the form of a thin sheet or small cusps. The flowable polymer is then atomized by turbulent or aerodynamic disintegration, depending upon conditions. Generally, viscosity of the polymer being atomized is as low as possible to enhance atomization.

Examples of rotary atomizers can be found in U.S. Pat. Nos. 4,256,677; 3,743,464, and 3,741,703. For instance, a rotating disk having an outer peripheral edge of teeth is disclosed in U.S. Pat. No. 4,256,677. By rotating this toothed disk at a constant speed, centrifugal force necessary to pinch off particles clinging to the peripheral teeth of this disk remains constant, hence all particles pinched off the peripheral teeth have substantially the same size. Particles formed by using a toothless disk would not be as uniform in size. U.S. Pat. No. 3,743,464 discloses an apparatus for sphering small particles which comprises a plurality of concentric, radially-spaced cylinders and a rotating plate underneath, with material introduced into the innermost cylinder being gradually sphered and propelled through openings into adjacent outer cylinders. U.S. Pat. No. 3,741,703 relates to improving uniformity of particle size generated during rotary atomization by turning upwardly the peripheral edge of the rotating atomization plate, whereby the particles of material broken up on the atomization plate are subjected to a more uniform flow and even treatment.

SUMMARY OF THE INVENTION

It is an object of the present invention to provide a process for preparing particles of bioabsorbable polymer.

It is another object of the present invention to provide bioabsorbable polymer particles which are useful, inter alia, in the repair of bone or tissue.

It is still another object of the present invention to provide a system for the delivery of bioactive substances such as medicinals, drugs, growth factors, etc., to damaged bone or tissue to promote the healing thereof.

These and other objects are achieved by the present invention which is directed to a method for producing particles of polymer which comprises subjecting a polymer having a viscosity of at least about 0.28 cp. to rotary atomization employing a rotary atomization unit possessing a substantially circular rotating element upon whose surface the polymer is made to impinge, whereupon the polymer breaks up into particles which are thrust away from the rotating element to solidify in free flight, the conditions of rotary atomization providing solid particles of the polymer within a range of average particle size of from about 0.1 to about 3 mm., and including a polymer temperature of from about 200° to about 300° C., a rate of rotation of the rotating element of from about 100 to about 1,000 rpm., and a temperature of the rotating element of from about 200° to about 300° C.

The process of the present invention provides significant advantages over the previously-used techniques in that bioabsorbable particles having a substantially uniform or sufficiently narrow range of average particle size, namely in the range of about 0.1 to about 3 mm., are obtained, with the polymer subjected to rotary atomization being in fairly viscous state, i.e. having a viscosity at least about 0.28 cp. At the same time the fiber content of such ultimately-formed particles can be suppressed. These particles, which are preferably spheroidal or bead-like, serve as scaffolding for new bony ingrowth when implanted into a bony defect as filler, e.g., as may be desired in dental or orthopaedic reconstruction. The particles of bioabsorbable polymer are resorbed by the bone or surrounding tissue, leaving behind a fully healed bone or tissue structure. Thus, particles of optimum size can be provided for filling the cavities or defects in bone, for providing delivery of biologically active substances to surrounding bone or tissue into which the particles are incorporated.

DESCRIPTION OF THE PREFERRED EMBODIMENTS

In the present invention, a preferably bioabsorbable polymer (inclusive of co-polymers) in flowable condition is subjected to rotary atomization. The polymer itself can be derived from polyglycolic acid, glycolide, lactic acid, lactide, dioxanone, e-caprolactone, trimethylene carbonate, etc., and various combinations of these and related monomers. Polymers of this type are known in the art, principally as materials for the fabrication of such surgical devices as sutures, wound clips, and the like, as disclosed, e.g., in U.S. Pat. Nos. 2,668,162; 2,703,316; 2,758,987; 3,225,766; 3,297,033; 3,422,181; 3,531,561; 3,565,077; 3,565,869; 3,620,218; 3,626,948; 3,636,956; 3,736,646; 3,772,420; 3,773,919; 3,792,010; 3,797,499; 3,839,297; 3,867,190; 3,878,284; 3,982,543; 4,047,533; 4,060,089; 4,137,921; 4,157,437; 4,234,775; 4,237,920; 4,300,565; and, 4,523,591; U.K. Pat. No. 779,291; D.K. Gliding et al., "Biodegradable polymers for use in surgery — polyglycolic/poly (lactic acid) homo- and co-polymers: 1", *Polymer,* Volume 20, pages 1459–1464 (1979) and D.F. Williams (ed.) *Biocompatibility of Clinical Implant Materials,* Vol. II, Ch. 9: "Biodegradable Polymers" (1981). Co-polymers of glycolide and lactide with or without additional monomers are preferred, and of these glycolide-lactide co-polymers are most preferred.

The polymer can be subjected to the rotary atomization alone or in very viscous solution. Suitable solvent includes any solvent which is both capable of dissolving the bioabsorbable polymer and possessing sufficient vapor pressure at or below the hardening point of the polymer so that the solvent evaporates when the polymer hardens Suitable solvents include those selected from the group consisting of t-butanol, benzene, p-dioxane, p-xylene, 1,2-dibromoethane, morpholine, dimethylsulfoxide, bromoform, and mixtures thereof, with p-dioxane and/or benzene being preferred. A summary of the properties of these solvents is presented in the following table:

| Solvent | Melting Point °C. | Vapor Pressure (Torr) at 25° C. | Estimated Vapor Pressure (Torr) At Melting Point |
|---|---|---|---|
| t-Butanol | 26.8 | 42.0 | |
| Benzene | 5.5 | 95.2 | 35.9 |
| p-Dioxane | 11.8 | 37.1 | 20.6 |
| p-Xylene | 13.5 | 8.7 | 4.3 |
| 1,2-Dibromoethane | 9.7 | 7.8 | 2.0 |
| Morpholine | −3.1 | 10.1 | 1.8 |
| Dimethylsulfoxide | 18.5 | 0.6 | |
| Bromoform | 8.0 | 5.9 | 2.3 |

A very thick or viscous solution of the bioabsorbable polymer in the solvent is prepared so that substantially solvent-free particles of bioabsorbable polymer will be obtained. In this regard, the concentration of the polymer in the solvent is preferably from about 1 to about 20% by weight, with approximately 3 to about 15% by weight being more preferred and about 5 to about 10% by weight being most preferred. More particularly, the polymer or solution thereof subjected to the rotary atomization has a viscosity of at least about 0.28 cp., more preferably at least about 0.30 cp., and most preferably at least about 0.32 cp. Clearly if the solvent is added, then the viscosity will be lowered.

Any desired drug, medicinal, or growth factor can be incorporated into the polymer prior to the atomization, e.g. by addition to the polymer in the customary amounts so that at the conclusion of the polymeric particle manufacturing process herein, the particles will contain a predetermined amount of one or more of such substances.

Thus, it is within the scope of this invention to incorporate one or more medico-surgically useful substances into the particles, e.g., those which accelerate or beneficially modify the healing process when particles are applied to a surgical repair site. For example, the bioabsorbable polymer particles can carry a therapeutic agent which will be deposited at the repair site. The therapeutic agent can be chosen for its antimicrobial properties, capability for promoting repair or reconstruction and/or new tissue growth or for specific indications such as thrombosis. Antimicrobial agents such as broad spectrum antibiotics (gentamicin sulphate, erythromycin or derivatized glycopeptides) which are slowly released into the tissue can be applied in this manner to aid in combating clinical and sub-clinical infections in a tissue repair site. A pharmaceutically acceptable dye can also be incorporated into the particles.

To promote repair and/or tissue growth, one or several growth promoting factors can be introduced into the particles, e.g., fibroblast growth factor, bone growth factor, epidermal growth factor, platelet derived growth factor, macrophage derived growth factor, alveolar derived growth factor, monocyte derived growth factor, magainin, and so forth. Some therapeutic indications are: glycerol with tissue or kidney plasminogen activator to cause thrombosis, superoxide dismutase to scavenge tissue damaging free radicals, tumor necrosis factor for cancer therapy or colony stimulating factor and interferon, interleukin-2 or other lymphokine to enhance the immune system.

The polymer is at a temperature of about 200° to about 300° C., preferably about 205° to about 280° C., and most preferably about 210° to about 260° C. when subjected to the rotary atomization. The rate of application of the bioabsorbable polymer to the rotary atomization unit can also be controlled to provide the resulting particles within a relatively narrow range of average particle size. The bioabsorbable polymer is preferably applied to the rotary atomization means at a rate of about 35 to about 70 g./min., more preferably at a rate of about 40 g./min. to about 65 g./min., and most preferably at a rate of about 45 g./min. to about 60 g./min. and may be applied to the atomizing means in any suitable fashion, e.g. from an extruding screw.

The present invention comprises a rotary atomization unit for atomizing the bioabsorbable polymer supplied thereto, so that the polymer is broken up into particles. Suitable rotary atomization units which can be utilized in accordance with the present invention include those disclosed in U.S. Pat. Nos. 4,256,677; 3,741,703; and 3,743,464. A circular rotating element, e.g. a spinning disk of the rotary atomization unit can be flat, convex, concave, or even bell-shaped, and can contain protruding vanes on a surface thereof.

The size of the spinning disk itself and the rpm., i.e. rate of rotation, can be interrelated to provide the optimum centrifugal acceleration for the formation of the particles of bioabsorbable polymer. Variations of this centrifugal acceleration will affect the ultimate size of the particles that are formed. The revolutions of the spinning disk are controlled within a range of about 100 to about 1,000 rpm., preferably within a range of about 130 to about 850 rpm., and more preferably within a range of about 160 to about 700 rpm. Furthermore, the disk itself is preferably between about 66 and about 86 cm. in diameter, more preferably between about 71 and about 81 cm. in diameter, and most preferably between about 75 and about 77 cm. in diameter. The instantaneous velocity of the disk is preferably controlled within a range of about 4 to about 40 m/sec., more preferably within a range of about 5 to about 35 m/sec., and most preferably within a range of about 6 to about 28 m/sec.

At the same time, the temperature of the spinning disk itself will affect the viscosity and fiber forming properties of the polymer subjected to the rotary atomization. Higher temperature of the spinning disk results in less fibers among the ultimately formed particles of bioabsorbable polymer. Therefore, temperature at which the flowable bioabsorbable polymer is atomized by the rotary atomization unit can be controlled by controlling the temperature of the spinning disk from about 200 to about 300° C., preferably from about 220° to about 280° C., and more preferably from about 240° to about 260° C. It should be noted that a solvent can be added to the polymer which will lower the melting point. Thus a lower processing temperature will be required. Lower processing temperatures may also be desirable when adding other components such as growth factors.

The bioabsorbable polymer is supplied in the form of a thin film onto a surface of the spinning disk of the rotary atomization unit, whereby the centrifugal acceleration breaks the thin film into particles of the bioabsorbable polymer. Preferably, this film of polymer is applied about 0.01 to about 3.5 mm. thick on the spinning disk, more preferably about 0.1 to about 3.2 mm. thick, and most preferably about 1.0 to about 3.0 mm. thick. Surface tension will cause the resulting particles of broken up polymer to ultimately harden into particles which are spheroidal or in the shape of beads, as these particles are radially discharged from the disk, i.e. fall off the edge of the rotary spinning disk of the rotary atomization unit and are cooled. Varying the film thickness on the spinning disk or varying the feed rate of the flowable bioabsorbable polymer affects particle size and fiber formation, with the thinnest film causing the smallest particles to be formed without any notable fibers being formed.

The particles of bioabsorbable polymer are allowed to fall off the edge of the spinning disk of the rotary atomization unit and are cooled, e.g., in air, before striking a collecting unit without being deformed. The spinning disk is preferably placed at a predetermined height to allow the spheroidally shaped particles to sufficiently air cool before striking the collecting unit, e.g. collecting trays, so that the particles or beads are not deformed upon striking the collecting unit and will not stick together when collected. The particles are allowed to cool to room temperature. More specifically, the disk is preferably positioned at height of about 190 to about 254 cm., more preferably at a height of about 200 to about 240 cm., and most preferably at a height of about 215 to about 230 cm. above the unit for collecting the falling particles The collecting unit may be provided, e.g., as disclosed in U.S. Pat. Nos. 4,256,677 and 3,743,464.

As noted above, the particles of bioabsorbable polymer formed by the present process all lie within a relatively narrow range of particle size. The average particle size of the particles of bioabsorbable polymer formed herein is within the range of about 0.1 to about 3.0 mm., preferably within the range of about 0.2 to about 1.5 mm., and more preferably within the range of about 0.3 to about 1.0 mm.

Furthermore, the fiber-forming tendencies of the polymer are suppressed. In other words, the amount of fibers formed during a run of the process is, at most, below a certain level and can even be totally non-existent. In this regard, the term "fiber" refers to materials which may be characterized as having a denier (see, e.g., *Plastics Terms Glossary. Fourth Edition*, Phillips Chemical Company, Bartlesville, Oklahoma). Particles having bulk densities of preferably about 0.25 to about 0.50 g./cc., more preferably about 0.30 to about 0.45 g./cc., and most preferably about 0.33 to about 0.43 g./cc. are formed by the process of the present invention.

The particles or beads formed of bioabsorbable polymer can be used as filler in a surgical prosthesis, i.e. for implantation in a cavity provided in bone or fibrous tissue to encourage regrowth and regeneration of the tissue. The particles of the bioabsorbable polymer are absorbed by the body at a predictable rate allowing tissue or bony ingrowth as absorption takes place. The rate of absorption is characteristic of the polymer utilized. Thus, e.g., a glycolide-lactide copolymer will often completely resorb within six months in contrast to about two years for polylactide homopolymer. The bioabsorbable polymer particles are readily molded to fill cavities or other contours. The beads can be heated to softening temperature, e g , to about 60° C., at which temperature they can be worked and shaped.

The present invention will be explained in greater detail, by way of the following examples:

EXAMPLE 1

A 25/75 glycolide-1-lactide copolymer (6,000 grams) was heated to a temperature of 215° C. and applied at a rate of 50 g./min. from an extruder of the screw type to a rotary atomizer having a spinning disk of 76 cm. diameter and rotating at a rate of 180 rpm., with the disk being heated to a temperature of 250° C. This polymer, which was at a viscosity of 0.41 cp., was applied as a thin film of about 1.4 mm. thick upon the spinning disk. The polymer film was broken up into particles which fell from the edge of spinning disk which was positioned at a height of 225 cm. above a collecting tray, so that the particles were sufficiently cooled to a temperature of 26° C. upon striking the tray.

The particles formed were then collected from the tray and 2905.52 grams of the particles were sifted through a particle size classification procedure in which sieve plates of varying mesh size were used to sift the particles. The amount of particles retained upon each respective sieve plate was collected and weighed, the results being presented in Table I.

EXAMPLE 2

The procedure of Example 1 was repeated with a bioabsorbable polymer constituted by a 90/10 glycolide-1lactide copolymer at a viscosity of 0.44 cp., with the rest of the numerical processing parameters all maintained as in Example 1, and with 1209.56 grams of the resulting particles of the bioabsorbable polymer being classified by the procedure described in Example 1. Results of this classification are reported in Table I.

EXAMPLE 3

The procedure of Example 1 was repeated with a 10/90 glycolide-1-lactide copolymer at a viscosity of 0.39 cp., and with the rest of the numerical processing parameters maintained as in Example 1. The resulting particles of bioabsorbable polymer were collected, with 879.80 grams of the same being classified according to the procedure described in Example 1. The results are reported in Table I.

TABLE I

| SIEVE NO.[1] | AMOUNT OF PARTICLES RETAINED ON RESPECTIVE SIEVE PLATES | | |
|---|---|---|---|
| | EXAMPLE 1 | EXAMPLE 2 | EXAMPLE 3 |
| 16 | 378.60 g. | 11.37 g. | — |
| 18 | 688.87 g. | 279.54 g. | 1476.30 g. |
| 20 | 1086.27 g. | 749.80 g. | 738.01 g. |
| 25 | 153.66 g. | 111.05 g. | 1190.30 g. |
| 30 | 400.45 g. | 76.26 g. | 348.51 g. |
| 40 | 156.53 g. | 30.32 g. | 126.68 g. |
| passed through 40 | 82.93 g. | — | — |
| TOTAL | 2905.52 g. | 1209.56 g. | 3879.80 g. |

[1] a No. 16 sieve has openings of 1.19 mm.;
a No. 18 sieve has openings of 1.00 mm.;
a No. 20 sieve has openings of 0.841 mm.;
a No. 25 sieve has openings of 0.707 mm.;
a No. 30 sieve has openings of 0.595 mm.; and
a No. 40 sieve has openings of 0.420 mm.

What is claimed is:

1. Method for producing particles of polymer which comprises
    subjecting a polymer having a viscosity of at least about 0.28 cp. to rotary atomization employing a rotary atomization unit possessing a substantially circular rotating element upon whose surface the polymer breaks up into particles which are thrust away from the rotating element to solidify in free flight,
    the conditions of rotary atomization providing solid particles of the polymer within a range of average particle size of from about 0.1 to about 3 mm., and including
    a polymer temperature of from about 200 to about 300° C.,
    a rate of rotation of said rotating element of from about 100 to about 1,000 rpm., and
    a temperature of said rotating element of from about 200 to about 300° C.,
    whereby fiber-forming tendencies of the polymer are suppressed.
2. The method of claim 1, wherein said solid particles of the polymer are provided within a range of average particle size of from about 0.2 to about 1.5 mm.
3. The method of claim 2, wherein said solid particles of the polymer are provided within a range of average particle size of from about 0.3 to about 1.0 mm.
4. The method of claim 1, wherein the polymer has a viscosity of at least about 0.30 cp.
5. The method of claim 4, wherein the polymer has a viscosity of at least about 0.32 cp.
6. The method of claim 1, wherein the temperature of the polymer is from about 205 to about 280° C.
7. The method of claim 6, wherein the temperature of the polymer is from about 210 to about 260° C.
8. The method of claim 1, wherein the rate of rotation of said rotating element is from about 130 to about 850 rpm.
9. The method of claim 8, wherein the rate of rotation of said rotating element is from about 160 to about 700 rpm.
10. The method of claim 1, wherein the temperature of said rotating element is from about 220 to about 280° C.
11. The method of claim 10, wherein the temperature of said rotating element is from about 240 to about 260° C.
12. The method of claim 1, comprising the additional step of supplying said polymer to said rotary atomization unit at a rate of about 35 to about 70 g./min.
13. The method of claim 12, wherein said polymer is supplied at a rate of about 40 to about 65 g./min.
14. The method of claim 13, wherein said polymer is supplied at a rate of about 45 to about 60 g./min.
15. The method of claim 1, comprising the additional step of supplying the polymer onto a surface of said rotating element at a thickness of about 0.01 to about 3.5 mm.
16. The method of claim 15, wherein the polymer is supplied at a thickness of about 0.1 to about 3.2 mm.
17. The method of claim 16, wherein the polymer is supplied at a thickness of about 1.0 to about 3.0 mm.
18. The method of claim 1, wherein said rotating element is from about 66 to about 86 cm. in diameter.
19. The method of claim 18, wherein the diameter of said rotating element is from about 71 to about 81 cm.

20. The method of claim 19, wherein the diameter of said rotating element is from about 75 to about 77 cm.

21. The method of claim 1, comprising the additional step of positioning said rotating element at a height of about 190 to about 254 cm. above a collecting unit, whereby said particles fall by this height after being thrust away from said rotating element and are solidified.

22. The method of claim 21, wherein said rotating element is positioned at a height of about 200 to about 240 cm. above said collecting unit.

23. The method of claim 22, wherein said rotating element is positioned at a height of about 215 to about 230 cm. above said collecting unit.

24. The method of claim 1, wherein said polymer is bioabsorbable.

25. The method of claim 24, wherein said bioabsorbable polymer is derived from the group consisting of polyglycolic acid, glycolide, lactic acid, lactide, dioxanone, e-caprolactone, trimethylene carbonate, and mixtures thereof.

26. The method of claim 25, wherein said polymer is a glycolide-lactide copolymer.

27. Method for producing particles of bioabsorbable polymer which comprises subjecting a polymer having a viscosity of at least about 0.28 cp. to rotary atomization employing a rotary atomization unit possessing a substantially circular rotating element upon whose surface the polymer breaks up into particles which are thrust away from the rotating element to solidify in free flight, the conditions of rotary atomization providing solid particles of the polymer within a range of average particle size of from about 0.1 to about 3 mm., whereby fiber-forming tendencies of the polymer are suppressed.

28. The method of claim 27, wherein said polymer is in solution when subjected to said rotary atomization.

29. The method of claim 28, wherein solvent of said solution is selected from the group consisting of t-butanol, benzene, p-dioxane, p-xylene, 1,2-dibromoethane, morpholine, dimethylsulfoxide, bromoform, and mixtures thereof.

30. The method of claim 27, comprising the additional step of adding a drug, medicinal, or growth factor to said polymer prior to said rotary atomization.

* * * * *